Figure 1:
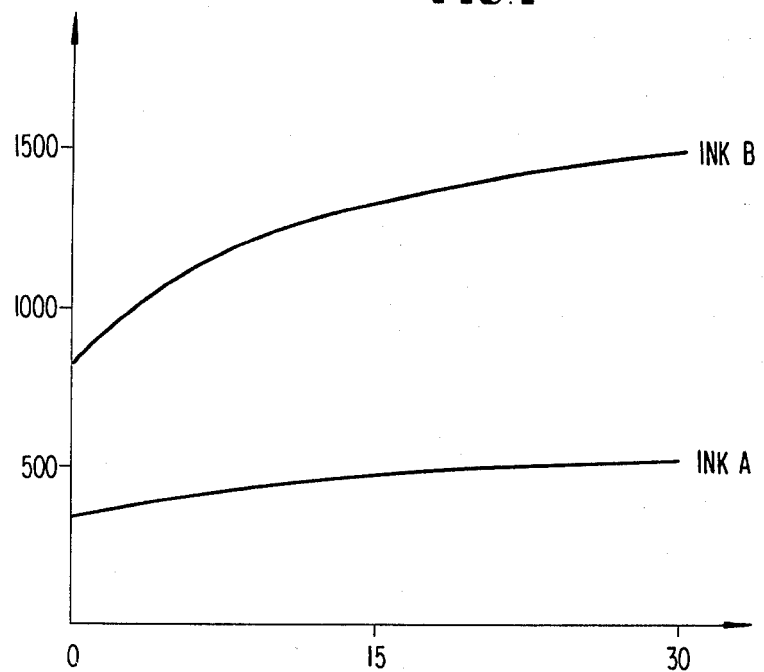

United States Patent [19]
Cabut et al.

[11] 3,981,734
[45] Sept. 21, 1976

[54] STABLE PIGMENT COMPOSITIONS

[75] Inventors: Louis Antoine Cabut, Nogent sur Oise; Michel Ernest Antoine Huille, Creil, both of France

[73] Assignee: Produits Chimiques Ugine Kuhlmann, Paris, France

[22] Filed: July 15, 1975

[21] Appl. No.: 596,132

[30] Foreign Application Priority Data

July 19, 1974 France .............................. 74.25131

[52] U.S. Cl. .............................. 106/20; 106/288 Q;
 106/309; 260/314.5
[51] Int. Cl.² ......................................... C09D 11/00
[58] Field of Search ............... 106/288 Q, 309, 20; 260/314.5

[56] References Cited
UNITED STATES PATENTS

| | | | |
|---|---|---|---|
| 3,296,008 | 1/1967 | Pugin .............................. | 106/288 Q |
| 3,536,502 | 10/1970 | Von et al. ......................... | 106/288 Q |
| 3,764,361 | 10/1973 | Kienzle et al. .................. | 106/288 Q |
| 3,767,442 | 10/1973 | Kienzle et al. .................. | 106/288 Q |

Primary Examiner—Patrick P. Garvin
Assistant Examiner—John P. Sheehan
Attorney, Agent, or Firm—Beveridge, DeGrandi, Kline & Lunsford

[57] ABSTRACT

The preparation of pigment compositions with a copper phthalocyanine base is disclosed, which compositions are stable to crystallization.

There is incorporated in the copper phthalocyanine pigments to be stabilized a compound of the formula:

$$Pc - (X - A)_n$$

wherein Pc is a phthalocyanine radical, X represents oxygen or sulfur or the —NH— bridge, A represents a branched or straight chain alkyl group having 4 to 20 carbon atoms or an aryl group which may be substituted by halogen atoms, a trifluoromethyl group or alkyl or alkoxy groups, and $n$ is a number from 1 to 8.

The pigment compositions prepared according to the invention are particularly well suited for the coloring of printing inks.

7 Claims, 4 Drawing Figures

STABLE PIGMENT COMPOSITIONS

The present invention relates to the preparation of pigment compositions with a base of copper phthalocyanine, which pigment compositions are crystallization stable. The pigment compositions prepared according to the invention are particularly well suited for dyeing of solvent base printing inks with which they give compositions whose rheological properties, in particular viscosity, remain stable with time.

It is known that copper phthalocyanine pigments of metastable forms, such as those designated by the terms alpha, gamma, delta, epsilon, possess the drawback of being crystallizable. In the presence of solvents and more particularly aromatic organic solvents, the metastable forms of copper phthalocyanine have a tendency to return to the stable beta form, which is accompanied by a change of shade or coloration, an increase of the thickness of the particles and a very considerable reduction of the coloring power.

This phenomenon is a definite problem for workers in various fields of technology and especially in paints and plastics and, more particularly, in solvent base printing inks where the phenomenon is accompanied by a considerable and undesirable modification of the rheological properties of the inks.

One suggested way to avoid such a polymorphic transformation consists in using a pigment in the stable beta form. However, this proposal does not completely solve the problem of the stability of the pigment, because although transformation of the crystalline form does not occur during exposure of the pigment in the beta phase to heat or crystallization promoting solvents, the pigment particles have a tendency to undergo a growth of crystals with, consequently, a loss of the coloring power, a modification of the pigment properties and an increase of the viscosity of the media in which the pigments are incorporated.

To avoid this problem, it has been proposed to stabilize the copper phthalocyanine in the alpha phase by introduction of chlorine in the molecule, preferably in position 4 (See U.S. Pat. Nos. 2,933,505 and 3,024,247). However, introduction of chlorine presents the drawback of causing a considerable greening of the pigment shades. Moreover, its effectiveness is not always satisfactory, particularly when in respect to avoiding an undesirable rheological change of printing inks.

More recently, it has been conceived of incorporating into the pigment to be stabilized certain stabilizing compounds derived from chloromethyl phthalocyanine (See French Pat. Nos. 2,114,243; 2,114,244; 2,114,245; and their first additions Nos. 73 18490, 73 18491 and 73 18492, respectively). This proposal entails an appreciable improvement of the stability of the pigment compositions in regard to aromatic solvents; however, the viscosity of the application media, in particular printing inks, made with these pigments continues to undergo considerable modifications with time.

It has now been found by applicants that pigment compositions may be prepared that have considerable advantages by incorporating into the copper phthalocyanine pigments to be stabilized a compound of the general formula:

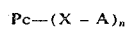    I.

wherein Pc is a phthalocyanine radical group or moiety, X represents oxygen or sulfur or the —NH— bridge, A represents a branched chain or straight chain alkyl having 4 to 20 carbon atoms or an unsubstituted aryl group or a halogen (Cl, Br, F, I), substituted aryl group, or aryl substituted by trifluoromethyl, or alkyl or alkoxy of low molecular weight (1 to 4 carbon atoms), $n$ is a number from 1 to 8, more particularly 3 or 4.

The phthalocyanine of the Pc residue can be metallized or not. As metallized phthalocyanine there may be mentioned in particular copper phthalocyanine in alpha or beta form.

The copper phthalocyanine pigments to be stabilized can be in the form of one of the alpha, beta, gamma, delta, epsilon crystalline forms (a form also designated by the letters R or X).

As examples of compounds of formula (I) there may be mentioned 4,4′,4′′,4′′′-tetraphenoxy copper phthalocyanine, 4,4′,4′′,4′′′-tetra-(4-methylphenoxy) copper phthalocyanine, 4,4′,4′′,4′′′-tetraphenylthio copper phthalocyanine, tetra-(4-methylphenylthio)-copper phthalocyanine, 4,4′,4′′,4′′′-tetra-(2,3,5-trimethylphenoxy) cuprophthalocyanine, 4,4′,4′′,4′′′-tetraanilino copper phthalocyanine, tetra toluidino copper phthalocyanine, tetrabutylthio copper phthalocyanine, tetra-dodecylthio copper phthalocyanine, tetra-dodecyl-oxy copper phthalocyanine, tetra-dodecylamino copper phthalocyanine, tetra-stearylamino copper phthalocyanine.

The compounds of formula (I) can be obtained by making a polyhalogeno-phthalocyanine react with an H—X—A compound, A and X being as defined above, according to known processes in the art; see French Pat. Nos. 816,859; 817,167 and 817,409; U.S. Pat. Nos. 2,122,137; 2,124,299 and 2,435,307 and British Pat. Nos. 470,703 and 471,435.

Incorporation of the stabilizing phthalocyanines of formula (I) in the pigments of the copper phthalocyanine to be stabilized can be done by simple mixing in an aqueous or organic suspension, at ambient temperature or hot at elevated temperature, followed by a filtering and drying. It is also possible to dry grind the phthalocyanine to be stabilized and the stabilizing phthalocyanine in the presence of a water-soluble salt, then take up the mixture with hot water to eliminate the salt, filter and dry. It is also possible to operate by malaxing the pigment to be stabilized in the form of a press paste with the stabilizing phthalocyanine.

From 1 to 20%, preferably 2 to 10%, of the compound of formula (I) is incorporated into the pigment.

The pigment compositions prepared according to the invention with a base of copper phthalocyanine pigments in one of the crystalline forms cited above and having incorporated therein a compound of formula (I) do not crystallize and do not change form in organic solvents, even when hot. Furthermore, the viscosity of the pigment compositions with a solvent base, in particular, that of printing inks, does not undergo variations during prolonged storage. They also have the advantage of having a good resistance to bleeding, which could not be anticipated because of the solubility of the compounds of formula (I) in aromatic solvents such as xylene or toluene. Further, they are fast to overspray; this property is verified by the absence of migration of pigments in a white paint covering an area colored with a phthalocyanine base paint.

The following examples in which the parts and percentages are expressed by weight illustrate the invention without limiting it.

EXAMPLE 1

To 65 parts of quinoline are added 27.2 parts of 2,3,5-trimethylphenol and 8 parts of sodium hydroxide. This mixture is heated at 120°–125°C for a half hour, then 1 part of copper powder and 14.2 parts of 4,4',4'',4'''-tetrachloro copper phthalocyanine (obtained by reaction of chlorophthalic anhydride with urea and copper chloride in the presence of titanium chloride in a trichlorobenzene medium) are added. It is heated, with reflux, until a sample is obtained, which when diluted with methanol, filtered and washed with water, no longer contains chlorine. After 48 hours of heating, the reaction is practically finished. It is cooled to about 50°C, diluted with methanol, filtered, washed with methanol then with water and dried.

There are obtained 16.6 parts of a chlorine-free greenish blue compound whose percent composition is the following:

| Analysis | C% | H% | N% | Cu% |
| --- | --- | --- | --- | --- |
| Calculated for $C_{68}H_{56}N_8O_4Cu$ | 73.15 | 5.02 | 10.04 | 5.95 |
| Found | 72.88 | 4.76 | 10.67 | 5.82 |

In a container placed in a shaking apparatus there are thoroughly mixed for about 10 hours, 95 parts of a chlorine-free copper phthalocyanine in alpha form with 5 parts of tetra-(2,3,5-trimethyl phenoxy) copper phthalocyanine prepared above. The pigment composition obtained is very stable in solvents; verification is performed in the following way: 1 gram of the pigment mixture is put in suspension in 100 ml of xylene then heated for 2 hours with reflux. After cooling, the product is filtered and washed with acetone. Examination of the X-ray diffractogram on the product thus treated confirms the non-development of the crystalline system.

On the contrary, in the absence of tetra-(2,3,5-trimethyl phenoxy) copper phthalocyanine, the same pigment when subjected to the same test, recrystallizes completely in the form of large needles of the beta variety and no longer presents any pigment character.

EXAMPLE 2

There are thoroughly malaxed 100 parts of press paste of copper phthalocyanine in the beta variety containing 25 parts of dry pigment with 1 part of tetra-(2,3,5-trimethyl phenoxy) copper phthalocyanine. The mixture is then dried then reduced to fine powder.

The pigment composition obtained is stable to crystallization. Further, the viscosity of solvent base printing inks, prepared from the pigment composition, practically do not vary during extended storage; checking is performed in the following way:

By means of a binder for photogravure containing 47% calcium resinate, 45% toluene and 8% formo-phenolic (phenol-formaldehyde) resin there are successively prepared, by grinding for 45 minutes in a ball mill, three inks respectively containing:

— Ink A: 10% of the above pigment composition
— Ink B: 10% of the pigment stabilized by 5% of tris-(2,3,5-trimethyl phenoxy methyl) copper phthalocyanine (Example 2 of French Pat. No. 2,114,243).
— Ink C: 10% of pigment of copper phthalocyanine in beta form, free of stabilizer.

These inks are stored at 25°C and the variation of their viscosity is measured as a function of time.

Figure 2:
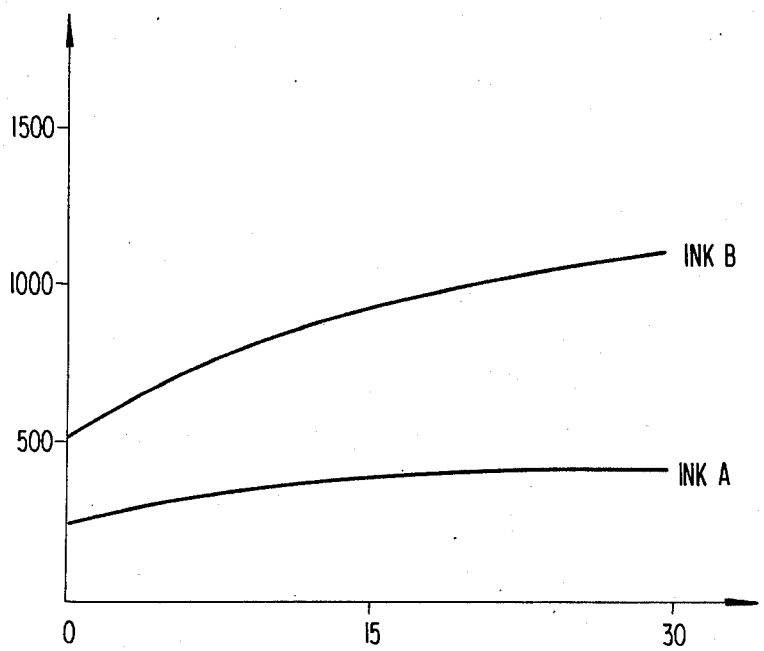

In the drawings, FIGS. 1 and 2 show the variations of viscosity of inks A and B during this ageing test. The viscosity of ink C is much higher and cannot be measured under these conditions. The length of storage in days is represented on the abscissa and the viscosity expressed in centipoises on the ordinate. The measurements were made respectively at 50 rpm (FIG. 1) and 100 rpm (FIG. 2) with mobile part No. 3 of a Brookfield viscosimeter.

Examination of the curves indicates that ink A presents a storing stability clearly superior to that of ink B. This property is very interesting because constancy of rheological properties, in particular viscosity, of printing inks is required more and more by modern printing techniques.

EXAMPLE 3

In 50 parts of quinoline are placed 18.8 parts of thiophenol and 8 parts of sodium hydroxide. This mixture is heated at 120°C for a half hour, then 1 part of copper powder and 14.2 parts of 4,4',4'',4'''-tetrachloro copper phthalocyanine are added. It is heated with reflux for 48 hours, then allowed to cool to about 50°C, diluted with methanol, filtered, washed with methanol, then with water and dried.

There are obtained 15.5 parts of a greenish blue compound, free of chlorine, whose composition corresponds approximately to that of tetra-(phenylthio) copper phthalocyanine.

| Analysis | C% | H% | N% | S% | Cu% |
| --- | --- | --- | --- | --- | --- |
| Calculated for $C_{56}H_{32}N_8S_4Cu$ | 66.69 | 3.17 | 11.11 | 12.70 | 6.35 |
| Found | 64.84 | 3.14 | 10.62 | 12.46 | 6.55 |

Into 1000 parts of water there are put into suspension 100 parts of copper phthalocyanine in alpha form obtained by dissolving a raw copper phthalocyanine in sulfuric acid and reprecipitation in water. To this suspension are added 5 parts of tetra(phenylthio) copper phthalocyanine prepared above; it is stirred for 2 hours at 60°C, then filtered, drained and dried.

The pigment composition obtained does not show any tendency to variation of crystalline form, nor to recrystallization when it is treated with boiling xylene under the test conditions described in Example 1.

When incorporated in a printing ink for photogravure with a base of calcium resinate, toluene and formo-phenolic resin (ink D), the product of this example leads to compositions whose viscosity varies only slightly during extending storage.

Figure 3:
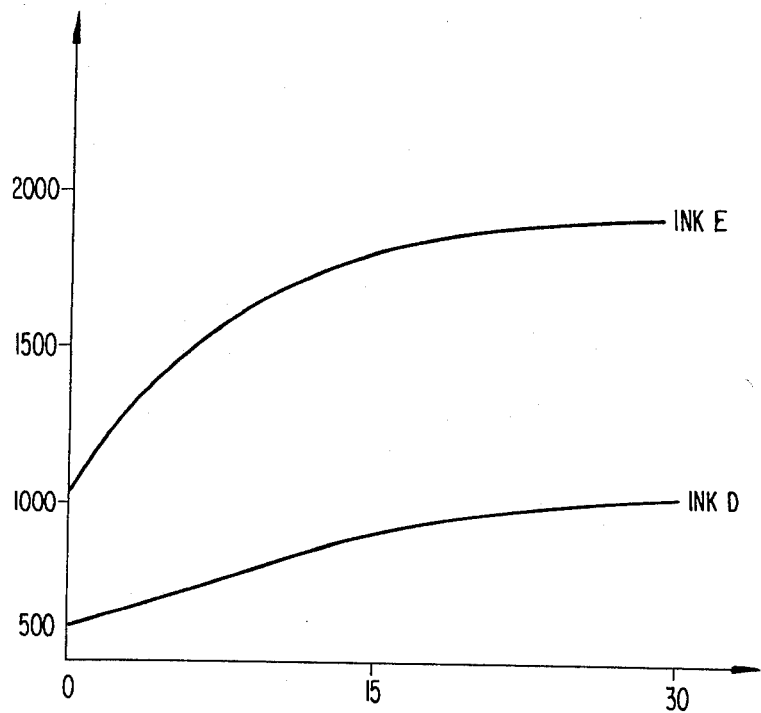
Figure 4:
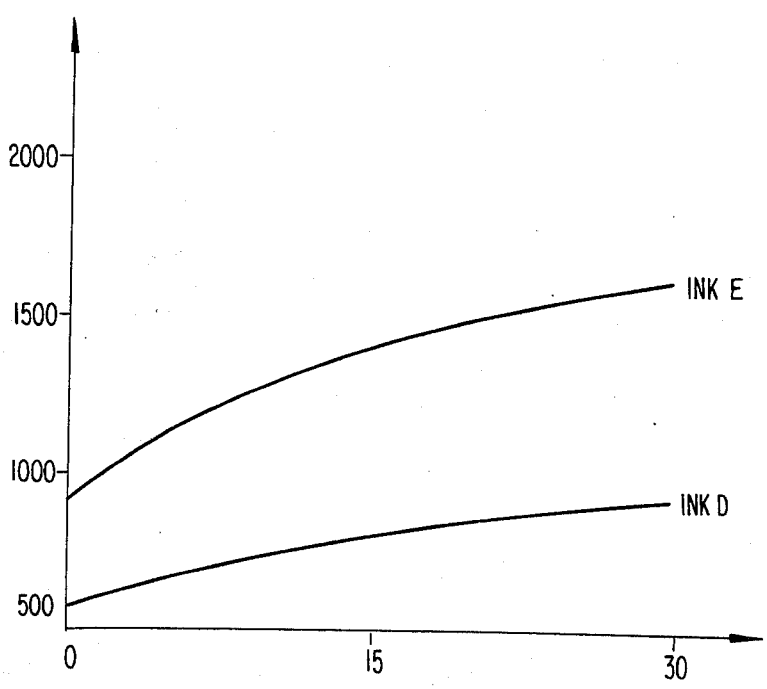

The same ink, pigmented with the pigment composition whose preparation is described in Example 5 of French Pat. No. 2,114,243 (ink E), presents a viscosity stability clearly inferior as can be seen from an examination of the curves described in FIGS. 3 and 4 representing the measurements made respectively at 50 and 100 rpm.

EXAMPLE 4

There are put into an autoclave 300 parts of aniline, 28.4 parts of tetrachloro copper phthalocyanine, 20 parts of potassium carbonate and 2 parts of copper powder. It is brought to 300°C and kept at this temperature for 12 hours. After cooling, it is diluted with methanol, filtered, drained, washed with methanol, then with water and dried. There are obtained 30.5 parts of a greenish blue product made up in great part of tetra-(anilino) copper phthalocyanine.

| Analysis | C% | H% | N% | Cu% |
|---|---|---|---|---|
| Calculated for $C_{56}H_{36}N_{14}Cu$ | 71.53 | 3.41 | 17.88 | 6.81 |
| Found | 70.82 | 2.98 | 17.48 | 7.25 |

There are thoroughly mixed 95 parts of a pigment of chlorine-free copper phthalocyanine in alpha form with 5 parts of the derivative prepared above. The pigment composition obtained is stable to recrystallization in paints and printing inks with a solvent base.

When the tetra-(anilino) copper phthalocyanine is replaced by an equivalent amount of tetra-(anilino) nickel phthalocyanine, the pigment composition obtained is also stable to solvents.

EXAMPLE 5

There is heated in an autoclave for about 12 hours at 250°C a mixture of 150 parts of n-dodecylamine, 25 parts of potassium carbonate, 2 parts of copper powder and 28.4 parts of 4,4′,4′′,4′′′-tetrachloro copper phthalocyanine. After cooling, a greenish product is separated whose composition after purification corresponds approximately to that of tetra-(dodecylamino) cuprophthalocyanine.

This product, incorporated at a rate of 5% in a pigment of copper phthalocyanine in alpha form, leads to a pigment composition which practically has no tendency to recrystallize upon contact with aromatic solvents.

EXAMPLE 6

There are dissolved 5 parts of sodium in 100 parts of n-dodecyl mercaptan. When thiolate is formed, there are added 17.8 parts of 4,4′,4′′,4′′′-tetrabromo copper phthalocyanine and the mixture is heated in a closed vessel at 250°C for 24 hours. After cooling, it is diluted with methanol, filtered and washed with methanol. There are obtained 20 parts of a bromine-free compound having the following composition:

| Analysis | S% | N% | Cu% |
|---|---|---|---|
| Calculated for $C_{80}H_{112}N_8S_4Cu$ | 9.30 | 8.15 | 4.65 |
| Found | 8.95 | 8.01 | 5.15 |

When 5% of this derivative is incorporated in a copper phthalocyanine pigment in beta form, there is obtained a pigment composition which does not have a tendency to flocculate in solvent base printing inks. The shade and pigment yield of these inks remain stable after many months of storage.

EXAMPLE 7

There are ground in a ball mill for about 48 hours 225 parts of raw copper phthalocyanine (obtained by synthesis of phthalic anhydride, urea and cuprous chloride in the presence of ammonium molybdate), 25 parts of tetraphenoxy nickel phthalocyanine (obtained by condensing tetrachloro nickel phthalocyanine with sodium phenate in the presence of copper) and 1000 parts of sodium sulfate. The mixture is diluted in 10,000 parts of hot water, filtered, the residue is washed with water to eliminate the salt and dried.

There is thus obtained a phthalocyanine pigment in alpha form which retains its crystalline form and its properties when it is subjected to the test described in Example 1.

In the absence of the stabilizing derivative, the pigment obtained is completely transformed into beta form not having the pigment quality, when it is subjected to the same test.

EXAMPLE 8

In a container placed in a shaking apparatus, there are thoroughly mixed for 24 hours, 3 parts of tetra-(2,3,5-trimethyl phenoxy) copper phthalocyanine and 97 parts of a pigment of chlorine-free copper phthalocyanine, made up mostly of the epsilon form whose diffraction spectrum under X-ray is characterized by the principal reticular distances 4.20 — 5.07 — 6.25 — 9.7 and 11.8 A. The mixture obtained is very stable in regard to crystallizing solvents such as toluene and xylene.

When this pigment composition is subjected to the boiling xylene test, examination of the X-ray diffractogram shows the non-evolution of the crystalline system. There are again found the reticular distances characteristic of the initial crystalline form: 4.20 — 5.07 — 6.25 — 9.7 and 11.8 A.

The same xylene treatment performed on the unstabilized pigment involves the complete transformation of this pigment into the beta form characterized by the reticular distances: 2.94 — 3.20 — 3.41 — 3.76 — 4.91 — 5.77 — 6.33 — 7.13 — 8.43 — 9.7 and 12.6 A.

Further variations and modifications will be apparent to those skilled in the art from the foregoing.

What is claimed is:

1. A process for stabilizing copper phthalocyanine pigments which comprises admixing a copper phthalocyanine pigment with 1 to 20% of a compound of the formula:

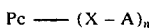

$$Pc \longrightarrow (X - A)_n$$

wherein Pc represents the unmetallized or metallized phthalocyanine moiety, X represents oxygen, sulfur or —NH—, A represents straight or branched chain alkyl having 4 to 20 carbons, unsubstituted aryl or aryl substituted by halogen, trifluoromethyl, alkyl or alkoxy, and $n$ is a number from 1 to 8.

2. A pigment composition consisting of an admixture of a copper phthalocyanine pigment with 1 to 20% of a stabilizing compound of the formula:

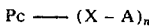

$$Pc \longrightarrow (X - A)_n$$

wherein Pc represents the unmetallized or metallized phthalocyanine radical,

X represents oxygen, sulfur or —NH—,

A represents straight or branched chain alkyl having 4 to 20 carbon atoms, unsubstituted aryl or aryl substituted by halogen, trifluoromethyl, alkyl or alkoxy, and $n$ is a number from 1 to 8.

3. A pigment composition according to claim 2 wherein copper phthalocyanine is present in one of the forms alpha, gamma, delta, epsilon or R in admixture with a compound of formula (I).

4. A pigment composition according to claim 2 wherein copper phthalocyanine is present in beta form.

5. A pigment composition according to claim 2 wherein $n$ is equal to 3 or 4.

6. A pigment composition according to claim 2 containing 2 to 10% of the stabilizing compound.

7. In a printing ink, the improvement which comprises having present therein the pigment composition as defined in claim 2.

\* \* \* \* \*